United States Patent [19]

Yokoyama et al.

[11] Patent Number: 5,367,644
[45] Date of Patent: Nov. 22, 1994

[54] COMMUNICATION SYSTEM

[75] Inventors: Etsuya Yokoyama, Himeji; Yasusi Okamoto, Itami, both of Japan

[73] Assignee: Mitsubishi Denki Kabushiki Kaisha, Tokyo, Japan

[21] Appl. No.: 869,339

[22] Filed: Apr. 16, 1992

[30] Foreign Application Priority Data

Apr. 30, 1991 [JP] Japan .................. 3-098422

[51] Int. Cl.⁵ .............................. G06F 13/00
[52] U.S. Cl. ..................... 395/325; 395/275
[58] Field of Search .......... 395/250, 275, 325

[56] References Cited

U.S. PATENT DOCUMENTS

| | | | |
|---|---|---|---|
| 4,344,132 | 8/1982 | Dixon et al. | 307/271 |
| 4,446,459 | 1/1984 | Bond, Jr. et al. | 395/325 |
| 5,146,564 | 9/1992 | Evans et al. | 395/250 |

FOREIGN PATENT DOCUMENTS 2578070 11/1986 France .
3506118 8/1988 Germany .
195453 3/1986 Japan .

*Primary Examiner*—Allen R. MacDonald
*Assistant Examiner*—Glenn A. Auve
*Attorney, Agent, or Firm*—Sughrue, Mion, Zinn, Macpeak & Seas

[57] ABSTRACT

A communication system in which a control microcomputer (1) for an electronic device and a peripheral device thereof are connected with each other with less signal lines by using serial communication interface function (SIO) integrated in a microcomputer, wherein since an accessing request signal (REQ signal:first signal) from the control microcomputer (1) to a communication IC (3) is also used as a response signal to an access request signal from the communication IC (3) to the control microcomputer (1), and on the contrary, all accessing request signal (INT signal:third signal) from the communication IC (3) to the control microcomputer (1) is also used as a response signal to an accessing request signal from the control microcomputer (1) to the communication IC (3), the number of control signals can be reduced.

12 Claims, 15 Drawing Sheets

COMMUNICATION SYSTEM

BACKGROUND OF THE INVENTION

1. Field of the Invention

The present invention relates to a communication system which connects to a microprocessor for controlling an electric device with a peripheral device thereof.

2. Description of the Related Art

Recently, various kinds of electric devices, such as devices for controlling an engine, for controlling suspension, and for controlling an air conditioner are mounted on an automobile. For transmission control of a communication network between such electric devices mounted on an automobile, CSMA/CD (Carrier Sense Multiple Access/Collision Detection) method is often used on the ground of extensibility of a system, ease of transmission control, and so on (for example, CAN by Bosch, PALMNET by Mazda and so on).

Generally, a transmission control device of these data communication devices is made to be one-chip IC, in order to make it easy to mount various kinds of electric devices as abovementioned. Accordingly, in the following, the transmission control devices of these data communication device is referred to as a communication IC.

FIG. 1 is a block diagram showing the construction of a conventional communication IC disclosed, for example, in Japanese Patent Application Laid-Open No. 61-195453 (1986). In the construction of this conventional example, a dual port RAM (hereafter, to be called DPRAM) is used as a transmitting/receiving buffer memory.

In FIG. 1, reference numeral 100 designates the communication IC which is connected to a bus line (transmission line) 101. In the DPRAM 102, an IMP (Interface Management Processor) 103, which controls data transmitted to and from the bus line 101, is connected by a parallel bus inside of the communication IC 100, and a control microprocessor 200 is connected by an exterior parallel bus.

In the abovementioned connection of the control microcomputer 200 to the communication IC 100, a total of 19 signal lines, that is, eight data busses, and eight address busses, three control lines, are necessary in the case where it is assumed that an 8-bit microcomputer is used as a control microcomputer 200 and a memory space of the communication IC 100 is 256 bytes, and twelve signal lines are necessary even when a bus by multiplexing a data bus and an address bus is used.

Next, explanation will be given on the operation of the conventional communication IC disclosed in the abovementioned Japanese Patent Application Laid-Open No. 61-195453 (1986).

In FIG. 1, a data a string (hereinafter, to be called a frame) received from the bus line 101 is stored in the DPRAM 102 through a receiver branch 105, transmitter branch 106, a shift register 104 and the IMP 103. The control microcomputer 200 controls the communication IC 100 read/write operations in the same way as a usual RAM by connecting address signal lines, data signal lines, and control signal lines to the DPRAM 102 for access control. FIG. 2 is a flow chart in which communication control procedure of the control microcomputer 200 of the case where data transmission of the control microcomputer 200 and the communication IC 100 is carried out by using such DPRAM 102 as a abovementioned is shown.

At first, in step S00, it is determined whether or not there is a transmission request from the control microcomputer 200, and if not, the process of step S07 being a receiving process and the following steps will be carried out. In the case where there is a transmission request, accessing from the IMP 103 to the DPRAM 102 is prohibited in step S01, and a determination is made whether or not access is possible from the control microcomputer 200 to the DPRAM 102 in step S02. When accessing is impossible, the process is interrupted, and when it is possible, the process of writing transmission data to the DPRAM 102 is performed in step S03. Next, processing for setting transmission status is performed in step S04, and processing the transmission request in step S05, respectively, and thereafter, accessing the IMP 103 is allowed in step S06 to complete the transmission process.

In addition, receiving data from the bus line 101, whether or not there is a transmission request, is confirmed in step S07. If there is a request, access of the DPRAM 102 by the microcomputer 200 is judged in step S08, and if the accessing is impossible, processing is interrupted and receiving in the DPRAM 102 is read out in step S10 after the transmission request is temporarily cleared in step S09 after accessing becomes possible.

Since a conventional communication IC is connected to a control microcomputer by a parallel bus as abovementioned, a number input/output ports of a control microcomputer are necessary for signals required for connection. Therefore, it is necessary to increase the input/output ports of a control microcomputer.

A communication IC i82526 made by Intel Co. Ltd. avoids the abovementioned problem by setting up an increase port in a communication IC. However, the communication chip cannot be connected as a peripheral device for a miniaturized electronic device.

While, it is possible to carry out such a connection as abovementioned by using a synchronous or an asynchronous serial communication interface (UART, USRT, SPI and so on) integrated generally in a microcomputer, in the case where it is necessary to control operation states such as transmitting/receiving data and error management, it is too difficult to realize the connection only by transmission control protocol of an 8-bit unit whose procedure is not determined.

SUMMARY OF THE INVENTION

The present invention has been devised in order to solve such a problem as abovementioned, and the object of the present invention is to realize the control of an IC for peripheral device which is required to control operation states of communication IC and so on, by using a serial communication interface function (hereinafter to be called SIO) integrated in a microcomputer.

The communication system related to the invention uses a first signal and a third signal both as access request signals between the control microcomputer and the communication IC and a response signal corresponding thereto by adding connection of a control microcomputer being a control device to a communication IC being a communication device to the SIO integrated in a communication microcomputer and by using three signals, that is, REQ signal, TXEN signal and INT signals, being first, second and third signal respectively, where the first or the third signal, which rises faster than the other to function as an access request signal and the other functions as a response signal thereof.

Furthermore, the control device so constructed as to transfer status information showing an operation state of a communication IC from a communication IC to a control microcomputer at first during data transferring.

In the communication system related to the invention, since an access request signal from a control microcomputer to a communication IC is also used as a response signal to an access request signal from the communication IC to the control microcomputer, and conversely, an access request signal from the communication IC to the control microcomputer is also used as a response signal to an access request signal from the control microcomputer to the communication IC, thereby the number of control signals is reduced.

And, since, at the beginning of data transfer sequence according to serial communication interface function between a communication IC and a control microcomputer, a status information of the communication IC is serially transmitted to the control microcomputer, the control microcomputer performs process of transmitting or receiving corresponding to operation state of the communication IC.

The above and further objects and features of the invention will more fully be apparent from the following detailed description with accompanying drawings.

DESCRIPTION OF THE PREFERRED EMBODIMENTS

In the following, explanation will be given on embodiments of the invention referring to drawings.

Figure 1:
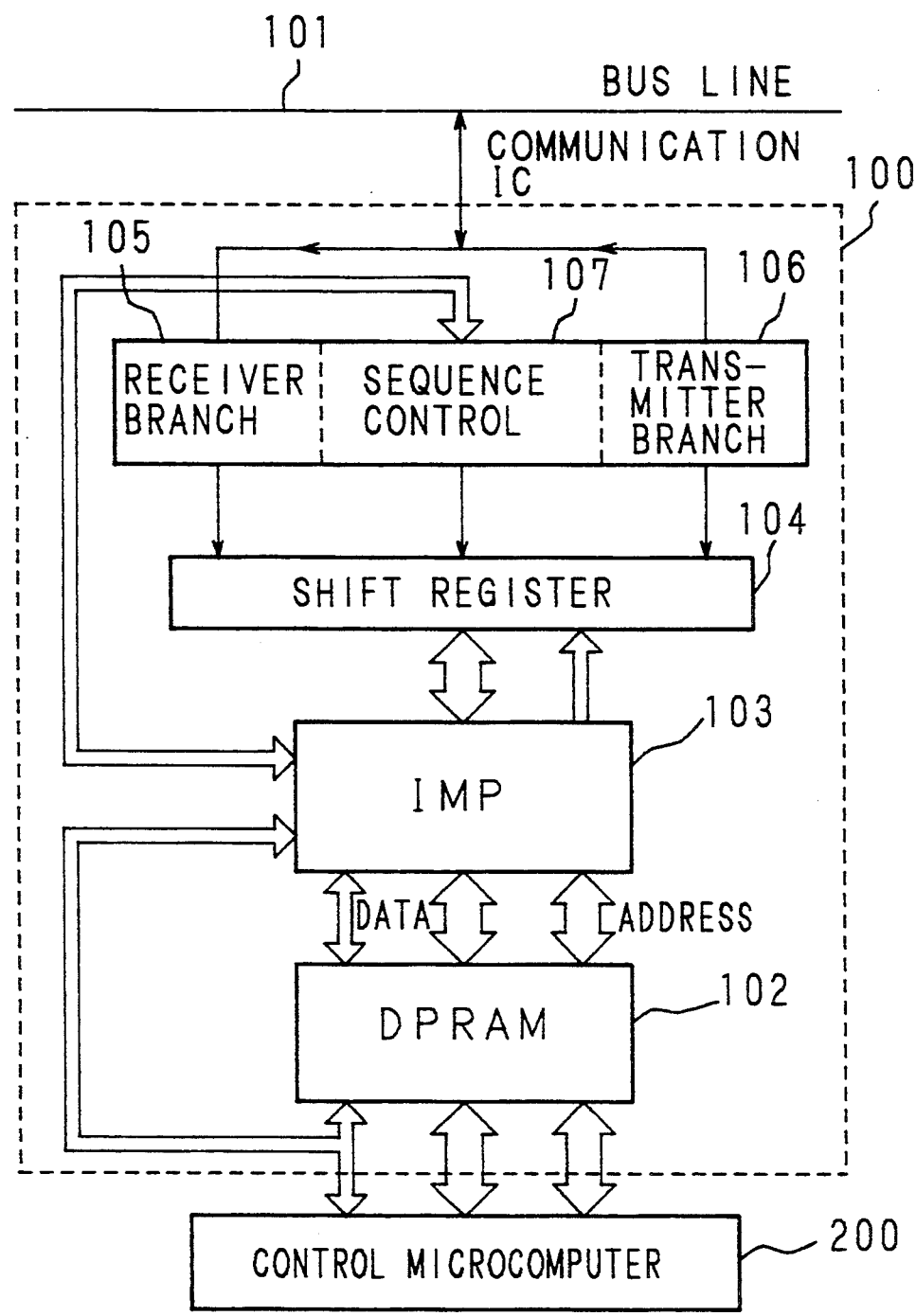
FIG. 1 is a block diagram showing a construction of a communication IC disclosed in Japanese Patent Application Laid-Open No. 61-195453 (1986) as a conventional example.
Figure 2:
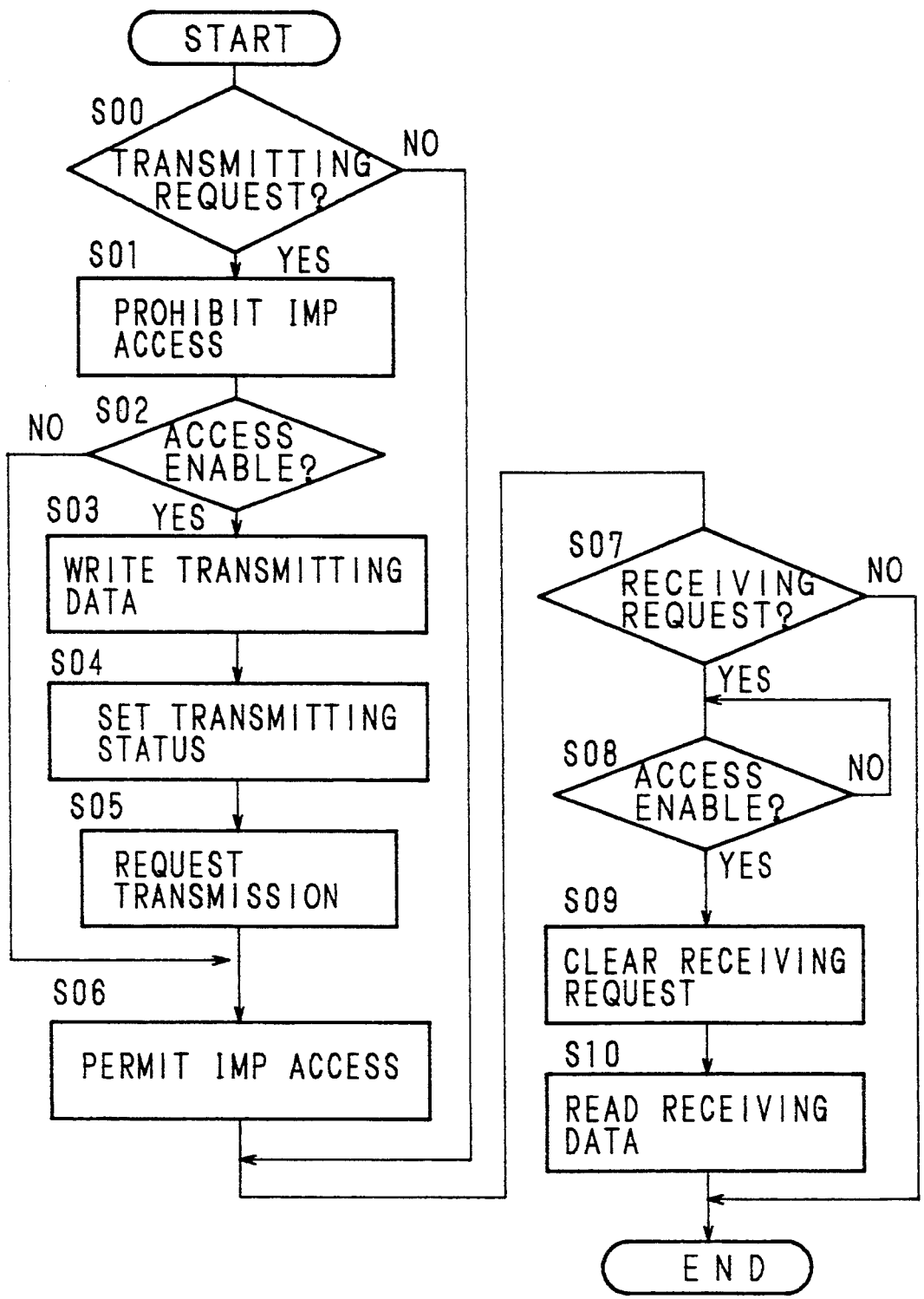
FIG. 2 is a flow chart showing a communication control procedure of a communication IC of a conventional example.
Figure 3:
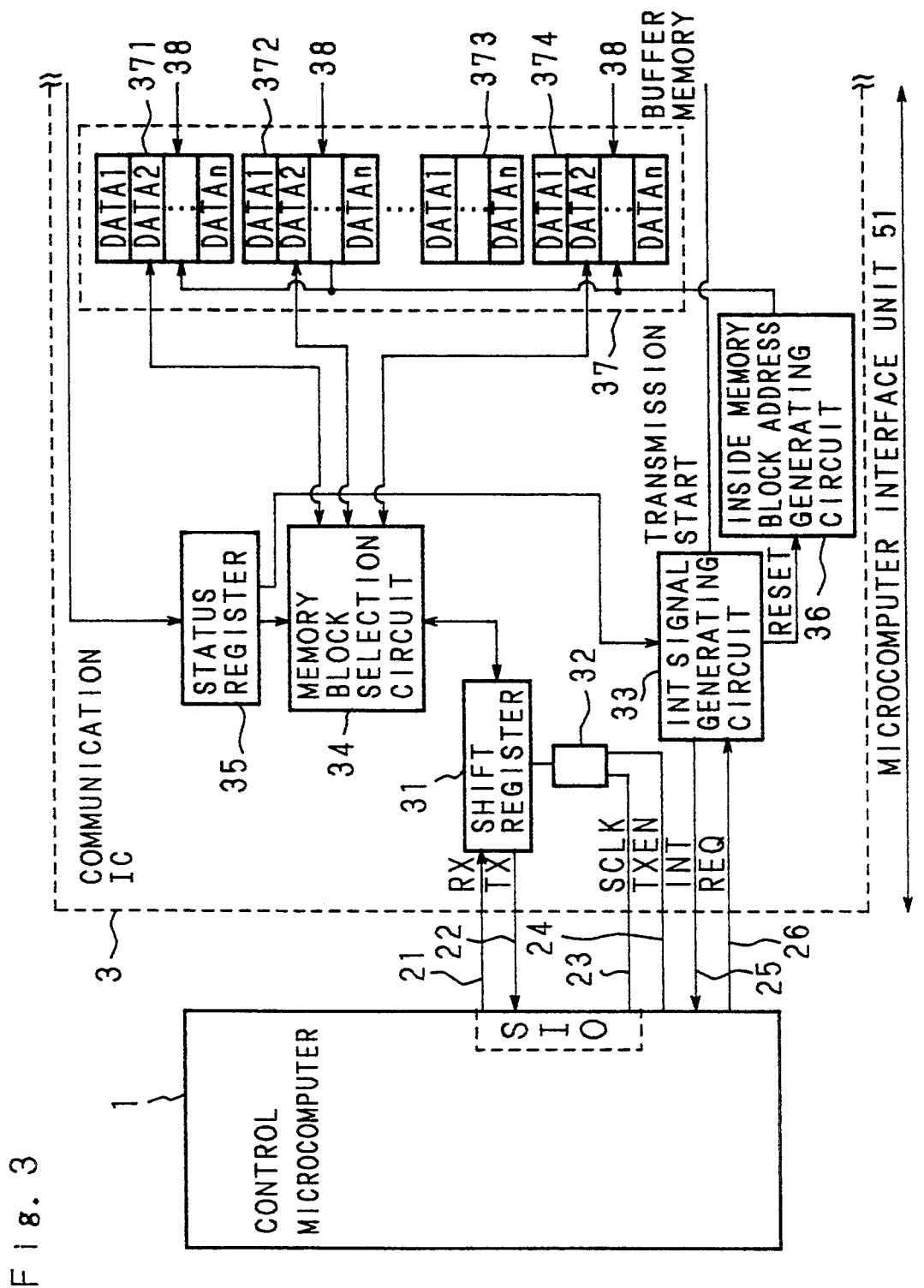
FIG. 3 is a block diagram showing one embodiment of a communication system of the invention.
Figure 4:
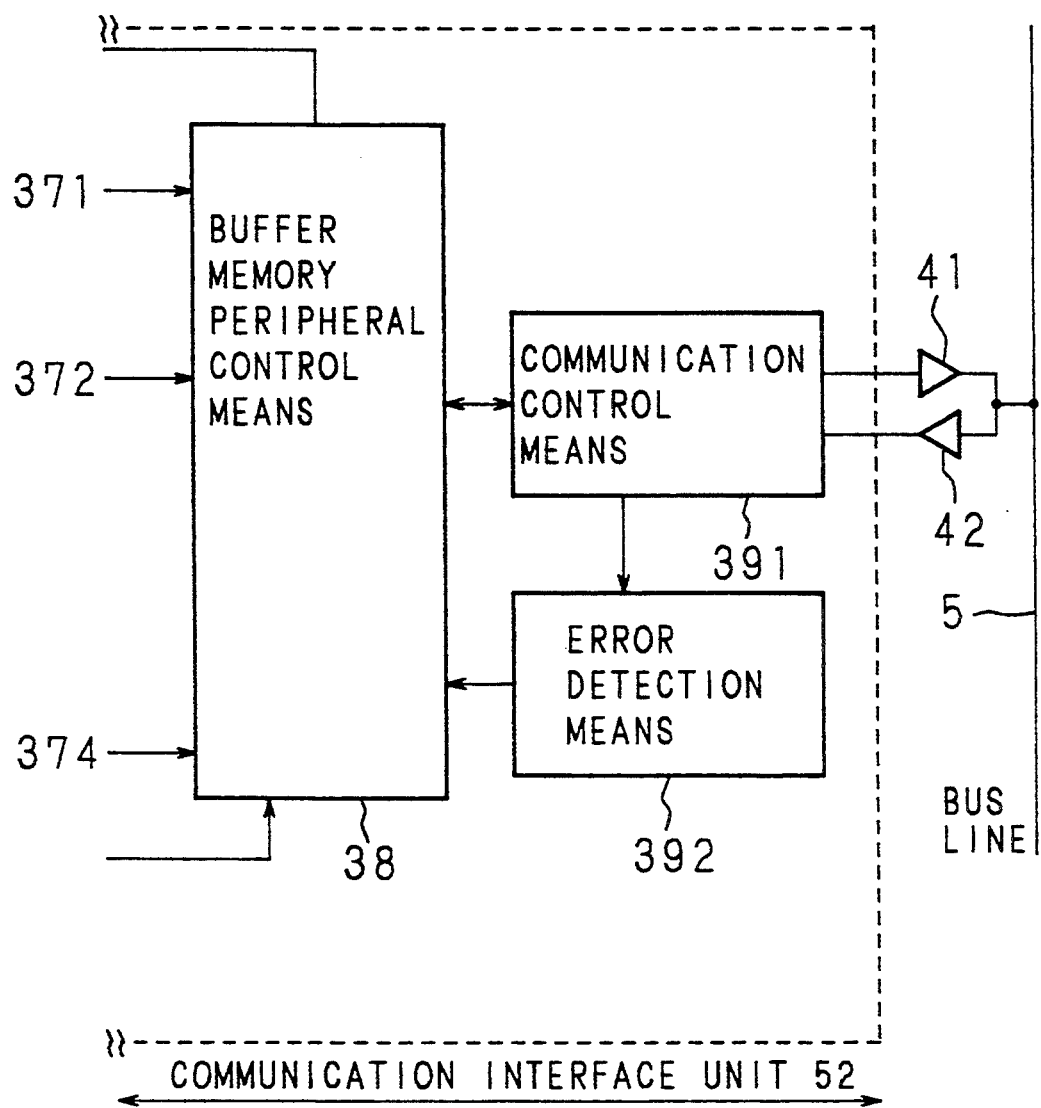
FIG. 4 is a block diagram showing one embodiment of a communication system of the invention.

In FIG. 3 and FIG. 4 are block diagrams showing an embodiment of a communication system of the invention, that is, showing the construction of a communication IC 3 as a communication device and a control microcomputer 1 as a control device. In addition, the communication IC 3 is constructed as one terminal device connected to a bus line 5, that is, one electronic device on a communication network. In addition, FIG. 3 generally illustrates the control microcomputer 1, while a left half part of the communication IC 3 and FIG. 4 generally illustrates a right half part of the communication IC 3 and the bus line 5.

In this embodiment, for connecting the control microcomputer 1 to the communication IC 3, three SIO signals, that is, an SIO (Serial Communication interface Function) transmission signal (hereinafter, to be called RX signal) 21 of the control microcomputer 1, an SIO transmission signal (hereinafter, to be called TX signal) 22 of the communication IC 3 and a synchronous clock (hereinafter, to be called SCLK) 23 of the aforesaid SIO, and three control signals, that is, a signal (a second signal, hereinafter to be called TXEN signal) 24 allowing output of the TX signal to the communication IC 3, a request signal (a third signal, hereinafter, to be called INT signal) 25 from the communication IC 3 to the control microcomputer 1, and a request signal (a first signal, hereinafter to be called REQ signal) 26 from the control microcomputer 1 to the communication IC 3, are used. In addition, the connection with the bus line 5 of the communication IC 3 is performed by a communication control means 391 on the communication IC 3 through a driver 41 and a receiver 42.

Next, explanation will be given on the internal construction of the communication IC 3.

As shown in block diagrams of FIG. 3 and FIG. 4, this communication IC 3 is composed of a microcomputer interface unit 51 and a communication interface unit 52 with a buffer memory 37 as the center.

The microcomputer interface unit 51 is composed of a shift register 31 which carries out the transmission and receipt of data between the SIO of the control microcomputer 1 and the communication IC 3, a buffer memory 37 comprising a plurality of memory blocks, a status register 35 which stores status information showing operation state of the communication IC 3, a memory block selection circuit 34 which selects memory block inside of the buffer memory 37 accessed by the shift register 31 according to the contents of the status register 35, a TX signal output allowing circuit. 32 which allows output of the TX signal 22 from the shift register 31, an INT signal generating circuit 33 which generates the INT signal 25 corresponding to the content of the status register 35 or the state of the REQ signal 26, an inside memory block address generating circuit 36 which generates addresses inside each memory block in the buffer memory 37 and so on.

Figure 5:
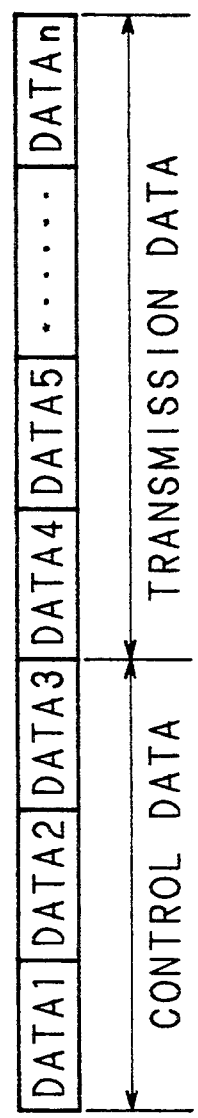
FIG. 5 is a schematic diagram showing an example of frame formats dealt on a transmission line.

The communication interface unit 52 is composed of the communication control means 391 performing the transmission and/or receipt of a communication data string (hereinafter to be called a frame and an example thereof is shown in FIG. 5) to the bus line 5 through the driver 41 and receiver 42, an error detecting means 392 detecting a communication error upon data transmission or receipt, a buffer memory peripheral control means 38 controlling writing/reading error information and data flow to and from the buffer memory 37 and for transferring and storing an operating state at any one time to the status register 35 and so on.

Next, explanation will be given on the operation of the system of the present invention having such a configuration as shown in FIG. 3 and FIG. 4.

In addition, FIG. 5 is a schematic diagram showing an example of frame format dealt on the bus line 5, each frame being composed of n number of unit data of 1 byte (8 bits). Specifically, three bytes of data 1, 2, 3 are control data and data 4, 5 . . . n are communication data.

Figure 6:
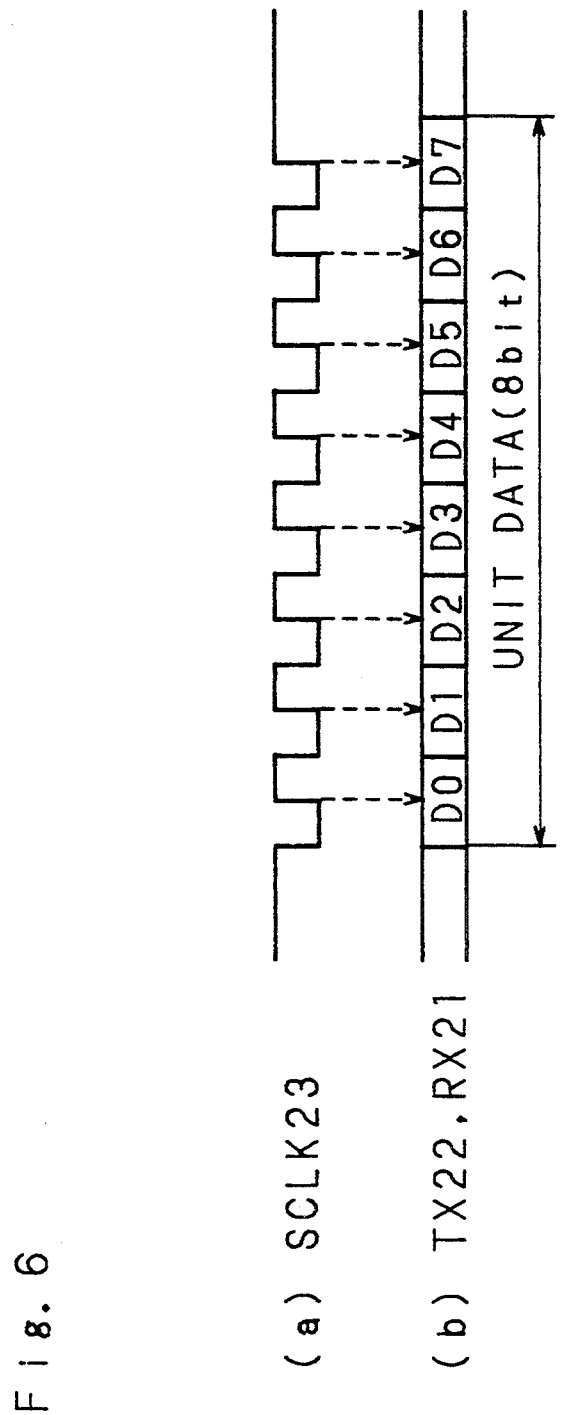
FIG. 6 is a timing chart showing an example of SIO transmission timing between a control microcomputer and a communication IC.

FIG. 6 is a timing chart showing an example of SIO transmission timing between the control microcomputer 1 and the communication IC 3, and each 1 bit of transmission data, as shown in FIG. 6(b) is transmitted from the control microcomputer 1 to the communication IC 3, or vice versa, as RX signal 21 or TX signal 22 in synchronism with each clock of SCLK 23 shown in FIG. 6(a).

In the following, explanation will be given on the data control procedure with use of the SIO between the control microcomputer 1 and the communication IC 3 in the configuration example shown in FIG. 3 and FIG. 4 in the case where the abovementioned frame format is used.

Figure 7:
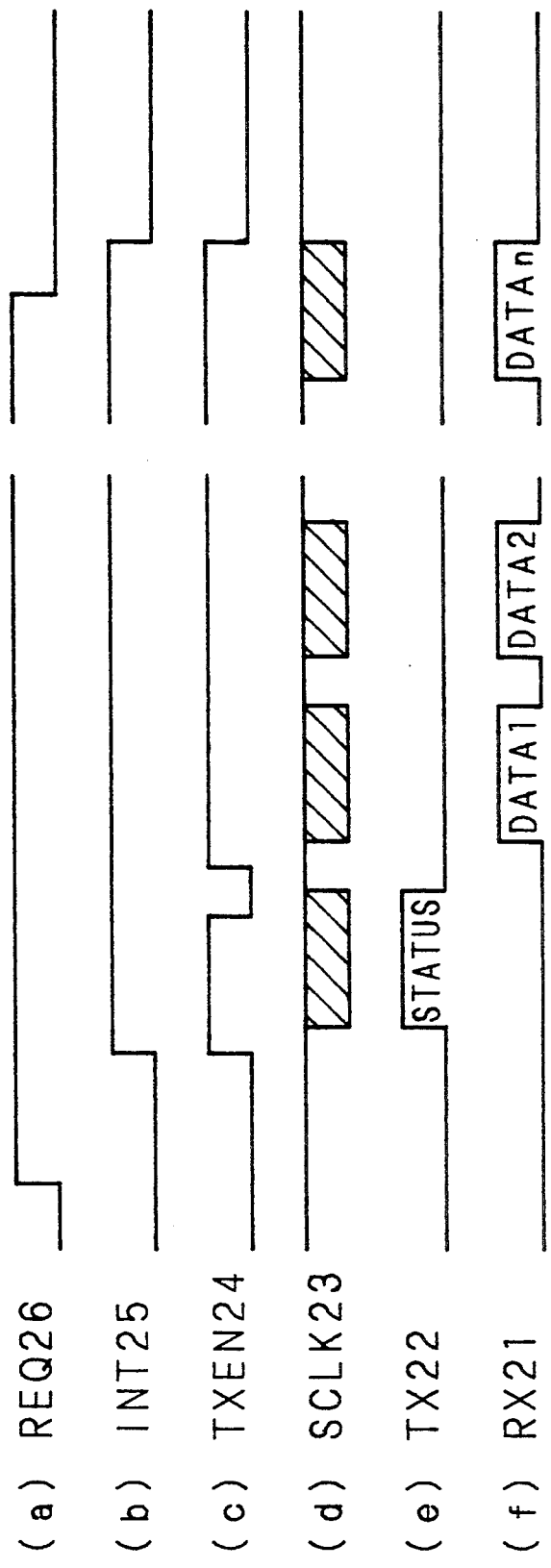
FIG. 7 is a timing chart showing a procedure in the case where an optional frame is transmitted from a control microcomputer to a transmission line.

At first, explanation will be given on the procedure for transmitting an optional frame from the control microcomputer 1 to the bus line 5, referring to the timing chart of FIG. 7.

The control microcomputer 1, at first, transmits a transmit request signal to the communication IC 3 as an access request signal by raising the REQ signal 26, as shown in FIG. 7(a). The REQ signal 26 is received by the INT generating circuit 33, and as shown in FIG. 7(b), the INT signal 25 is raised as a confirming signal therefor. Next, the communication IC 3 transmits the content of the status resister 35 to the control microcomputer 1 by the TX signal 22, as shown in FIG. 7(e), through the memory block selecting circuit 34 and the shift register 31.

Figure 8:
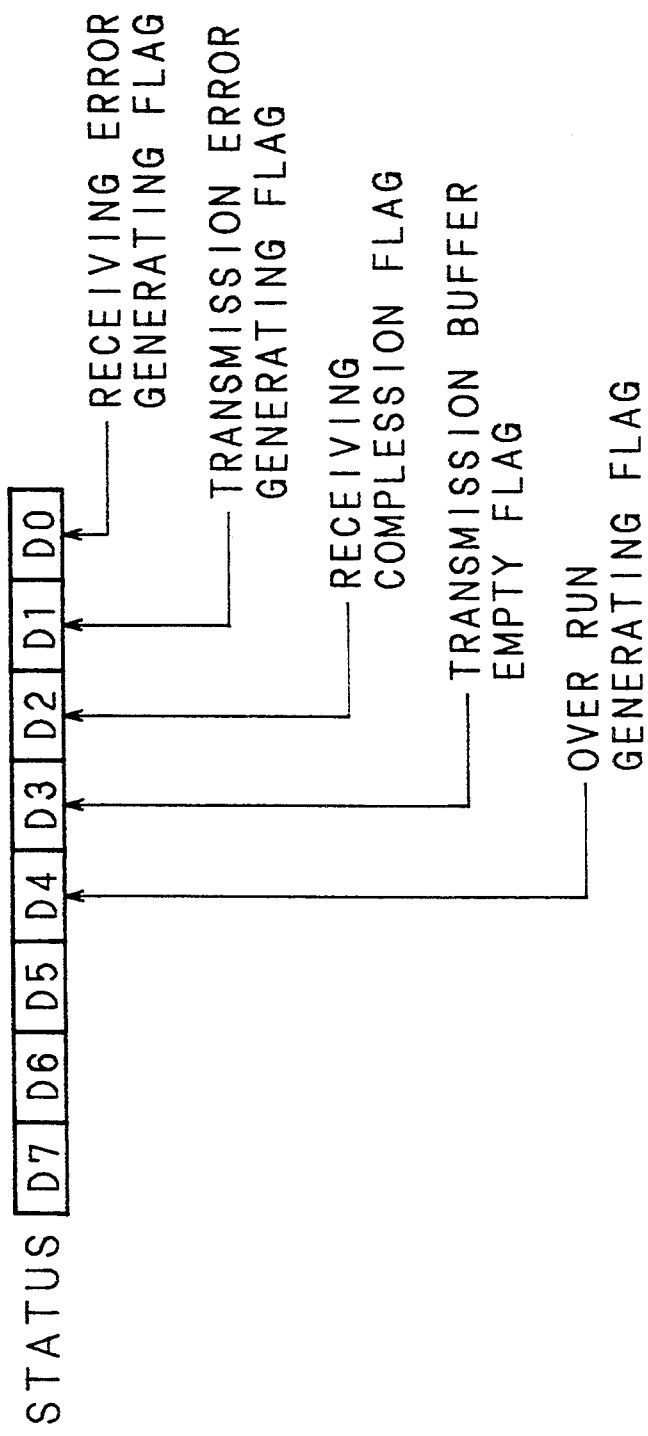
FIG. 8 is a schematic diagram showing an example of contents of a status register.

FIG. 8 is a schematic diagram showing an example of the contents of the status register 35. The status register 35 has an 8-bit configuration in the embodiment as shown in FIG. 8, and includes various flags showing operation states of the communication IC such as a receiving completion flag (D2) which shows completion of receiving frame from the bus line 5, a transmission buffer empty flag (D3) which shows that a transmission buffer is in empty status, an overrun generating flag (D4) which is set in the case where a receiving frame is further inputted from the bus line 5 regardless of the fact that a receiving buffer is in full state due to the continuous receipt of frames, a transmitting error generating flag (D1) and a receiving error generating flag (D0) showing the generation of transmitting error and receiving error.

The control microcomputer 1 checks each flag of theaforementioned status register 35, and in the case where only the transmission buffer empty flag (D3) is set, it divides the frame shown in FIG. 5 into a plurality of unit data being from data 1 to data n, and transmits them, as shown in FIG. 7(f) to the communication IC 3 by the RX signal 21.

At the process of receiving status, the control microcomputer 1 prohibits, when it cannot receive the continuous TX signal 22, the TX signal from outputting from the communication IC 3 by making the TXEN signal 24 to be logical "0" as shown in FIG. 7(c).

In the communication IC 3, the transmission data is stored in a memory block in the buffer memory 37 designated by the memory block selecting circuit 34 through the shift register 31.

For example, in the case when a first memory block 37 is used as a transmission buffer onto the bus line 5, the memory block selecting circuit 34 transmits unit data in the shift register 31 to the first memory block 371 and stores it therein. At this time, the inside memory block address generating circuit 36 counts up the address value every time unit data inside of the shift register 31 is transferred and controls the storage of data so that unit data is stored in the first memory block 371 sequentially from data 1 to data n.

In addition, the inside memory block address generating circuit. 36 is reset every time the INT signal 25 rises and performs addressing for storing a data string for one frame in order in memory block in a period from rising to falling of the INT signal 25.

The communication IC 3, after the data string for one frame is temporarily stored in the first memory block 371 in the buffer memory 37, detects the completion of the transferring process by the falling of the REQ signal 26, and transmits the data string for one frame stored in the first memory block 371 onto the bus line 5 through the buffer memory peripheral control means 38, communication control means 391 and driver 41.

As shown in FIG. 7(a) and FIG. 7(b), the communication IC 3 makes the INT signal 25 fall after the detection of falling of the REQ signal 26, thereby completing the transmitting process from the control microcomputer 1 to the communication IC 3 process.

In the following, explanation will be given on the operation of receiving a frame from the bus line 5 in the case when a second memory block 372 is used as a receiving buffer.

Figure 9:
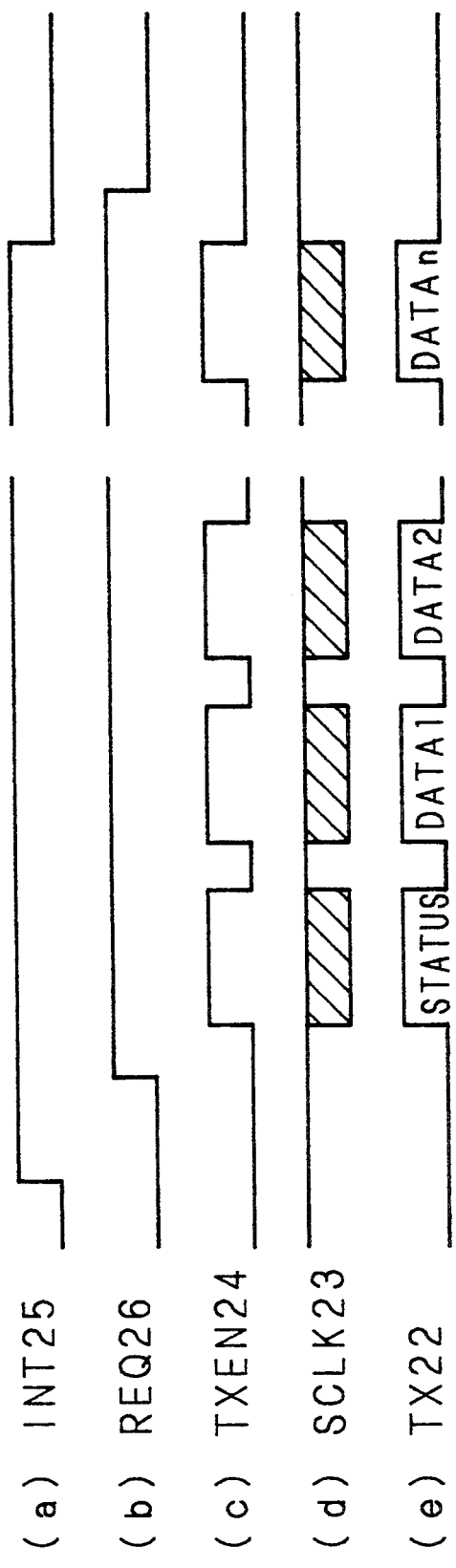
FIG. 9 is a timing chart showing a transferring procedure at the time of receiving.

The frame transmitted from the bus line 5 is temporarily stored in the second memory block 372 through the receiver 42, communication control means 391 and buffer memory control means 38. After the completion of the storing process, the communication IC 3 transmits the contents of the second memory block 372 to the control microcomputer 1. FIG. 9 is a timing chart illustrating the timing for transmitting the data to the control microcomputer 1.

The communication IC 3, as shown in FIG. 9(a), makes the INT signal 25 rise to request accessing the control microcomputer 1. When the control microcomputer 1 detects the rising of the INT signal 25, it makes the REQ signal 26 rise as a response signal thereto, as shown in FIG. 9(b). When the TXEN signal 24 shown in FIG. 9(c) is logical "1", the communication IC 3 at first transmits the contents (status) of the status register 35 by the TX signal 22 shown in FIG. 9(e). The microcomputer 1 checks each flag of the status register 35 shown in FIG. 8 after receiving a status, and when it detects that the receiving completion flag (D2) is set, it performs receiving process of the TX signal 22 after the status. Thereby, data 1, 2, 3 . . . are transmitted in order from the communication IC 3 to the control microcomputer 1.

In the abovementioned receiving process, the control microcomputer 1 can prohibit the TX signal 22 shown in FIG. 9(e) from being transmitted by making the TXEN signal 24 shown in FIG. 9(c) fall to be logical "1" in the state where receiving process is unable to be done.

In the data transmitting process, the memory block selecting circuit 34 selects the second memory block 372 by the fact that the receiving completion flag (D2) of the status register 35 is set, and the content of the second memory block 372 are transmitted to the control microcomputer 1 in order through the shift register 31 and the TX signal 22 corresponding to address values generated by the inside memory block address generating circuit 36.

The transmission process is completed by informing the control microcomputer 1 of the receipt of data according to the rising of the INT signal 25 such that the control microcomputer 1 detects the falling of the INT signal 25 to make the REQ signal 26 to fall.

The above explanation was for an example of data transmission between the control microcomputer 1 and the communication IC 3 at the usual transmission and receiving, and in the following, explanation will be given on the operation of the case when access requests are generated at almost the same time from the control microcomputer 1 and the communication IC 3 to compete with each other.

Figure 10:
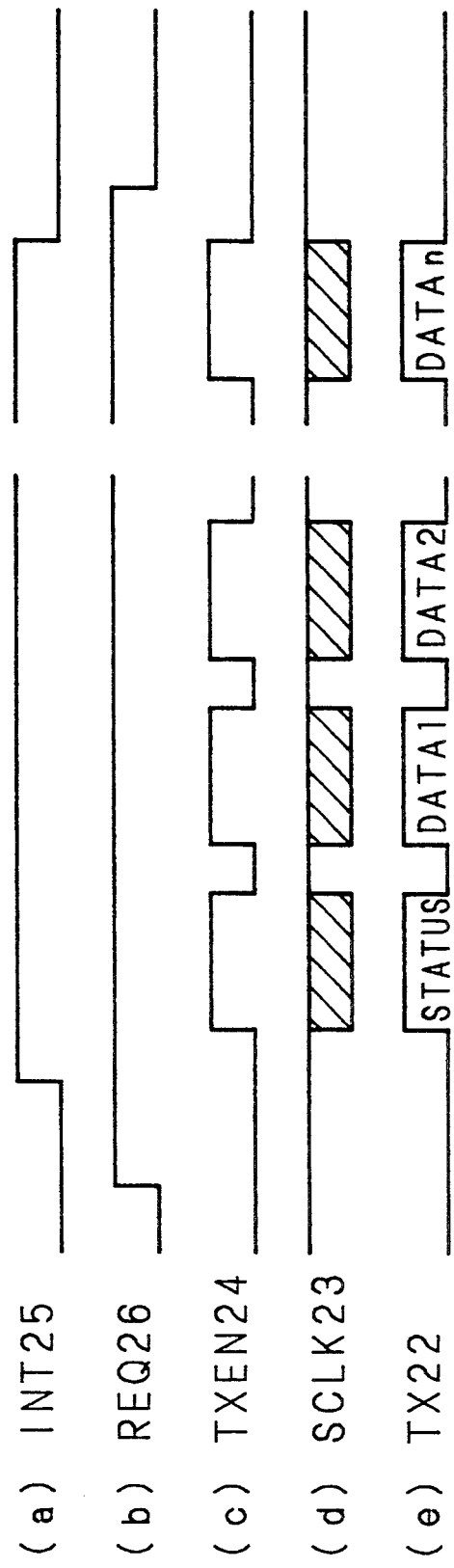
FIG. 10 is a timing chart explanatory of operations in the case where access requests are generated from a control microcomputer and a communication IC at almost the same time to compete with each other.

FIG. 10 is a timing chart illustrating the operation in the case where access requests are generated at almost the same time from the control microcomputer 1 and the communication IC 3 to compete with each other.

As shown, for example, in FIGS. 10(a) and (b), even in the case where the REQ signal 26 rises faster then the INT signal 25 according to an access request from the control microcomputer 1, the communication IC 3 performs transmission of a receiving frame to the control microcomputer preferentially if the receiving completion flag (D2) of a status shown in FIG. 8 is set. The control microcomputer 1 detects the compete of accessing by checking the bit of each flag of the status register 35 to perform a receiving process of transmission data from the communication IC 3.

As explained above, basically, when either of the REQ signal 26 being an access request signal of the control microcomputer 1 or the INT signal 25 being an access request signal of the communication IC 3 is high, the one which rises faster obtains an accessing right, and in the case where the access requests compete with each other, this state can be avoided by temporarily abandoning the accessing right when the control microcomputer 1 detects the state where the compete of accessing is generated by checking each flag of the status register 35.

In the abovementioned embodiment, the communication IC 3 includes error detecting means 392 shown in FIG. 4 which enables the control microcomputer 1 to read out error information in the same procedure as the abovementioned embodiment by storing the error information detected by the error detecting means 392 into a specific memory block in the buffer memory.

Figure 11:
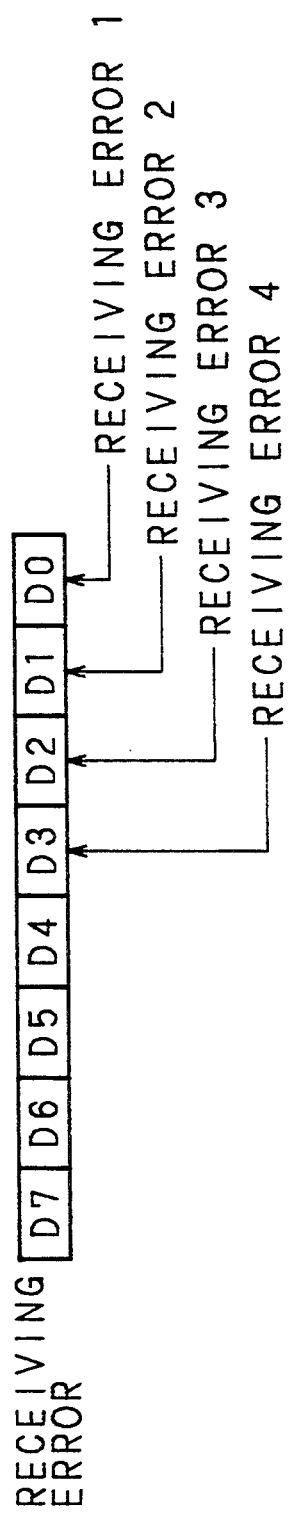
FIG. 11 is a schematic diagram showing an example of contents of a receiving error information.
Figure 12:
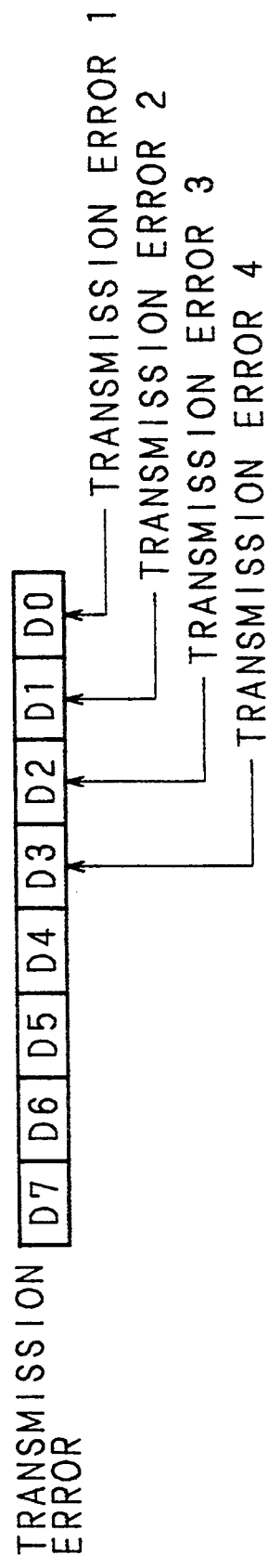
FIG. 12 is a schematic diagram showing an example of contents of a transmitting error information.
Figure 13:
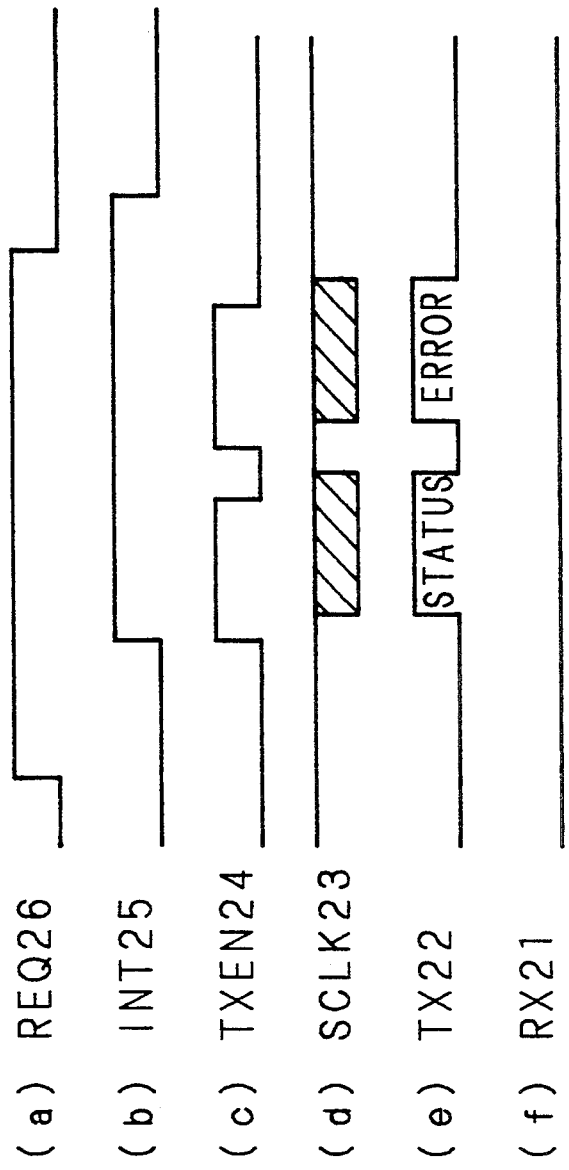
FIG. 13 is a timing chart showing a procedure of an error information in the case where a communication IC is accessed from a control microcomputer.
Figure 14:
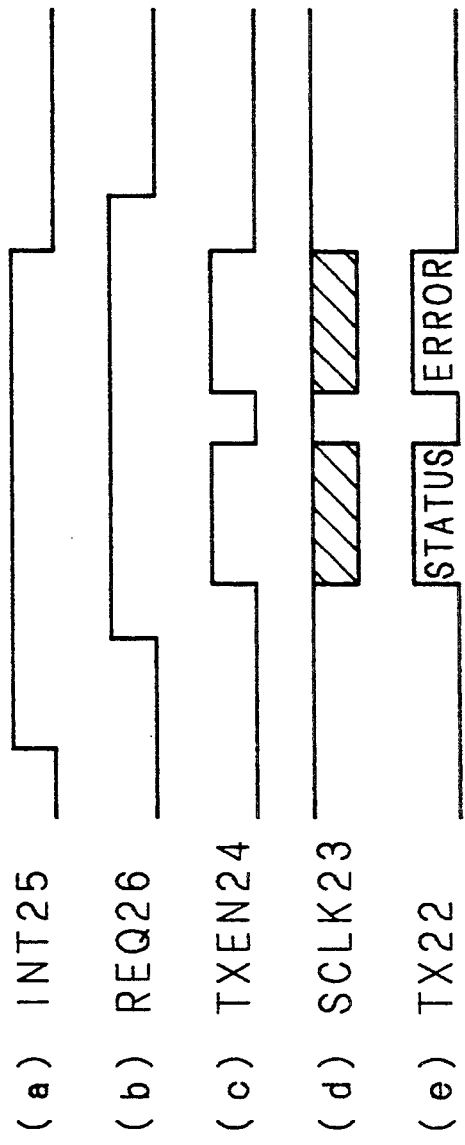
FIG. 14 is a timing chart showing a procedure of an error information in the case where a control microcomputer is accessed from a communication IC.

As shown, for example, in schematic diagrams of FIG. 11 and FIG. 12, error information is divided into an error upon receiving data from the bus line 5 (hereinafter, to be called a receiving error) and an error upon transmission to the bus line 5 (hereinafter, to be called a transmitting error), and the receiving error is to be stored into an n-1 th memory block 373 and the transmitting error is to be stored to an n-th memory block 374 respectively through the memory peripheral control means 38. In the case where such a construction is adopted, it is possible to transmit an error information from the communication IC 3 to the control microcomputer 1 in the same way as the abovementioned embodiment at the timing of a timing chart shown in FIG. 13 when the communication IC 3 is accessed from the control microcomputer 1 and at the timing of a timing chart shown in FIG. 14 when the control microcomputer 1 is accessed from the communication IC 3, respectively.

Next, explanation will be given on the procedure for the communication control process of the microcomputer 1 referring to the flow chart shown in FIG. 15.

At first, the control microcomputer 1 judges the presence of transmitting request of itself in step S20, and if there is, it detects the rising of the INT signal 25 being a response signal in step S28 and moves to status check operation after the REQ signal 26 is made to rise in step S22. In the case where there is no transmitting request in step S20, it judges whether the INT signal 25 being a receiving request from the communication IC 3 rises or not, and if the signal rises, it starts status-checking in step S25 and the following steps after the REQ signal 26 is made to rise in step S24 as the response to the rising of the INT signal 25.

In the case when there is no receiving request in step S21, processing is completed.

The status check 1 in step S25 is a process checking the receiving completion flag (D2). As a result, the flag shows the receiving frame is performed in step S31. In the case where conditions of step S28 are not realized, the transmitting buffer empty flag (D3) is checked in step S26. In the case where the transmitting buffer empty flag (D3) is in the state of being set and there is a transmitting request in step S20, the process moves to step S30 which is a process of a transmitting frame being transmitted.

If the condition in step S26 are not realized, an error is judged to be generated and in step S27, an error mode is judged. Taking-in error information corresponding to the respective states is performed in the same way as the abovementioned embodiment in step S28 when the receiving error generating flag (D0) or tile overrun generating flag (D4) is set and in step S29 when the transmitting error generating flag (D1) is set.

When either of the abovementioned processes is carried out, the REQ signal 26 is made to fall in step S32 to complete a series of processings.

Figure 15:
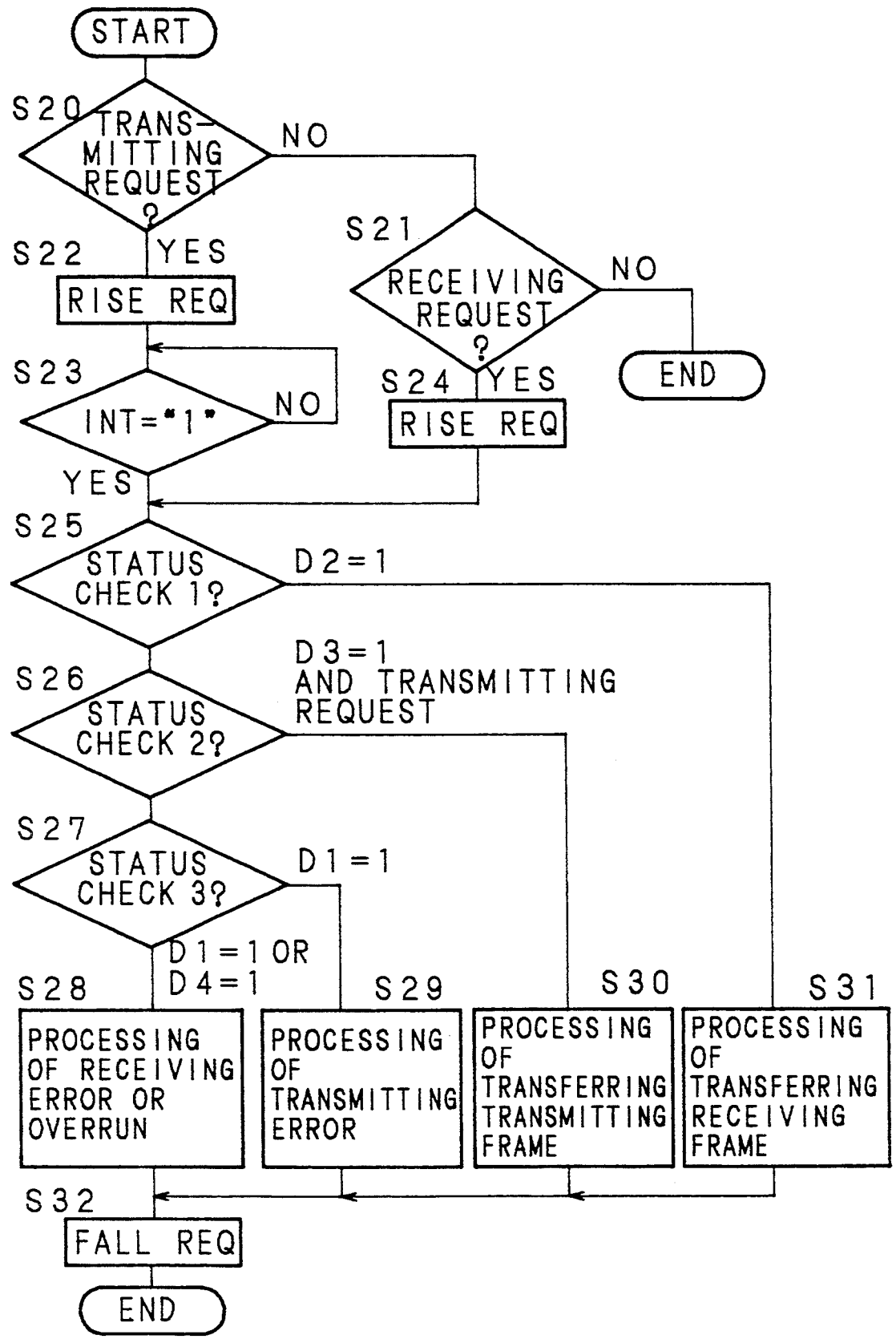
FIG. 15 is a flow chart showing a procedure of a communication control process of a control microcomputer.

The flow chart shown in FIG. 15 is obtained by making the communication control portion of software of the control microcomputer 1 to be sub-routine, and the operation control of the communication IC 3 is easily realized by the software control of the control microcomputer 1.

As abovedescribed, according to tile communication system of the present invention, operation control of the communication IC can be realized only by four control signals including SIO signal, for an inside buffer memory of the communication IC is used by being divided into a plurality of memory locations which can be automatically accessed by contents of a status register showing an operation state of the communication IC by using an SIO integrated in a microcomputer.

By transmitting contents of a status register to the control microcomputer at the beginning of data transmission between the communication IC and the microcomputer, the access competing of the communication IC with the control microcomputer can be avoided.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of tile claims, or equivalents of such metes and bounds thereof are therefore intended to be embraced by the claims.

What is claimed is:

1. A communication system providing control information to an exterior device based upon information received from said exterior device, said communication system comprising:

data processing means for receiving information data from said external device and for transmitting control data to said external device; and control means, coupled to said data processing means, for receiving said information data supplied from said external device via said data processing means and for transmitting said control data to said external device via said data processing means;

said control means comprising:

means for generating a first signal which operates as one of a first transfer request signal for transferring said control data to said data processing means for controlling said external device and a first response signal upon receipt of a second transfer request signal from said data processing means, and for generating a transfer signal for synchronizing the transfer of said information data and said control data to and from said control means, respectively; and said data processing means comprising:

storage means for storing said information data and said control data; and means for generating a third signal which operates as one of said second transfer request signal for transferring said information data received from said external device to said control means and a second response signal upon receipt of said first transfer request signal from said control means;

wherein transfer of said control data is based upon receipt of said second response signal from said data processing means in response to said first transfer request signal, and wherein transfer of said information data is based upon receipt of said first response signal from said control means in response to said second transfer request signal;

said transfer signal being generated by said control means once one of said first and second transfer request signals is acknowledged.

2. The communication system as defined in claim 1, wherein said data processing means further comprises detecting means, coupled to said storage means, for detecting an operation state of said data processing means, and selecting means, also coupled to said storage means, for automatically selecting one of said information data and said control data to be read from said storage means according to information indicating said operation state of said data processing means, wherein said operation state is one of a first operation state for transferring said control data to said external device and a second operation state for transferring said information data to said control means.

3. The communication system as defined in claim 1, wherein said data processing means further comprises a shift register, connected between said storage means and said control means, for serially transferring said control data from said control means to said storage means and for serially transferring said information data from said storage means to said control means.

4. The communication system as defined in claim 1, wherein a conflict between a transfer request from both said control means and said data processing means is resolved by determining which of said first and said second transfer request signals shifted to a predetermined voltage level first, such that the signal which shifts first is determined to be an access request signal while the other signal is determined to be an acknowledge signal.

5. The communication system as defined in claim 4, wherein said data processing means further comprises detecting means, coupled to said storage means, for detecting an operation state of said data processing means, and selecting means, also coupled to said storage means, for automatically selecting one of said information data and said control data to be read from said storage means according to information indicating said operation state of said data processing means, wherein said operation state is one of a first operation state for transferring said control data to said external device and a second operation state for transferring said information data to said control means.

6. The communication system as defined in claim 4, wherein said data processing means further comprises a shift register, connected between said storage means and said control means, for serially transferring said control data from said control means to said storage means and for serially transferring said information data from said storage means to said control means.

7. The communication system as defined in claim 4, wherein one of said information data and said control data is transferred depending upon said operation state of said data processing means determined by said access request signal and said acknowledge signal.

8. The communication system as defined in claim 7, wherein said data processing means further comprises detecting means, coupled to said storage means, for detecting an operation state of said data processing means, and selecting means, also coupled to said storage means, for automatically selecting one of said information data and said control data to be read from said storage means according to information indicating said operation state of said data processing means, wherein said operation state is one of a first operation state for transferring said control data to said external device and a second operation state for transferring said information data to said control means.

9. The communication system as defined in claim 7, wherein said data processing means further comprises a shift register, connected between said storage means and said control means, for serially transferring said control data from said control means to said storage means and for serially transferring said information data from said storage means to said control means.

10. The communication system as defined in claim 7, wherein a series of data transferring processes are completed when said access request signal falls below said predetermined voltage level at the completion of data transferring and said acknowledge signal thereafter falls below said predetermined voltage level.

11. The communication system as defined in claim 10, wherein said data processing means further comprises detecting means, coupled to said storage means, for detecting an operation state of said data processing means, and selecting means, also coupled to said storage means, for automatically selecting one of said information data and said control data to be read from said storage means according to information indicating said operation state of said data processing means, wherein said operation state is one of a first operation state for transferring said control data to said external device and a second operation state for transferring said information data to said control means.

12. The communication system as defined in claim 10, wherein said data processing means further comprises a shift register, connected between said storage means and said control means, for serially transferring said control data from said control means to said storage means and for serially transferring said information data from said storage means to said control means.

* * * * *